Patented Sept. 27, 1932

1,879,605

UNITED STATES PATENT OFFICE

HENRY DREYFUS, OF LONDON, ENGLAND

MANUFACTURE OF ALIPHATIC ACIDS AND THEIR ESTERS

No Drawing. Application filed March 8, 1929, Serial No. 345,441, and in Great Britain March 16, 1928.

This invention relates to the manufacture of aliphatic esters and acids.

In a previous U. S. patent application of myself and W. Bader Serial No. 138,116 filed 27th September, 1926, is described inter alia how acetic acid (in the free state or in the form of its methyl ester) may be produced by subjecting dimethyl ether and carbon monoxide to the action of heat and pressure in the presence of inorganic acid catalysts, namely inorganic acids or inorganic acids containing an organic group, or acid salts of such acids.

According to the present invention I have now found that methyl acetate and acetic acid can be prepared in a very satisfactory manner by causing dimethyl ether to react with carbon monoxide in presence of certain other catalysts, namely metallic compounds capable of forming acetic acid or acetates by reaction with carbon monoxide, e. g. alkali alcoholates, (e. g. sodium methylate or sodium ethylate), or alkali formates (e. g. sodium formate, potassium formate).

The reaction may if desired be performed under ordinary atmospheric pressure but the reaction proceeds more rapidly under high pressures. The pressure may be as high as 100, 200 or 300 atmospheres or any higher pressure that can conveniently be attained in practice.

The reaction may be performed at ordinary temperatures but it is greatly accelerated by elevated temperatures. I preferably perform the reaction under pressure (e. g. under pressure of 50 to 300 atmospheres or more) at temperatures over 100° C., e. g. from about 200° to 450° C. and preferably at temperatures of from about 300° to 400° C. The catalysts may with advantage be employed, distributed over or supported on a solid carrier such for instance as coke, graphite or the like.

In performing the invention I may employ carbon monoxide as such or in the form of industrial or other mixtures with hydrogen and/or inert gases, e. g. methane, nitrogen etc. Thus I may use water gas, producer gas or coke oven gas, but it is preferable to use carbon monoxide alone.

The reaction may be performed in any suitable vessels, for instance vessels made of or lined with copper or other metals not liable to produce carbonyls by reaction with the carbon monoxide.

The carbon monoxide and dimethyl ether may be subjected to the reaction in any suitable manner. Conveniently the process may be carried out in a continuous manner by mixing the carbon monoxide (or a gas containing the same) with dimethyl ether vapour and passing the mixture into a reaction chamber preferably containing an alkali methylate or ethylate, the reaction chamber being heated to a temperature of about 250° to 400° C. and preferably 300° to 400° C. but the invention is not limited in this respect.

Or again, the dimethyl ether may be submitted to the reaction continuously with its production; thus for instance a mixture of methyl alcohol and sulphuric acid may be heated in the known manner to produce dimethyl ether, and a regulated stream of carbon monoxide be run through the hot reaction mixture, whereby a mixture of carbon monoxide and dimethyl ether may be obtained and subjected continuously to the reaction of the present invention. For instance the mixture of carbon monoxide and dimethyl ether so produced may be caused to pass through compressors or the like in which it is raised to the desired pressure (e. g. 70 to 150 atmospheres or more) and from thence through a reaction vessel containing an alkali alcoholate heated to the desired temperature (e. g. 300° to 400° C.).

The reaction of the invention enables methyl acetate and/or free acetic acid to be produced, according to the quantity of water present in the reaction, and according to the conditions obtaining. The presence of water favours the production of free acetic acid, whereas the absence of water (or presence of small quantities of water) and the presence of excess of dimethyl ether favour the production of methyl acetate. Thus it is possible to direct the reaction to the production of methyl acetate practically exclusively by using an excess dimethyl ether in presence of little or no water. If however no excess of dimethyl ether is employed and sufficient water is present, acetic acid is obtained, while mixtures of methyl acetate and acetic acid in various proportions can be obtained in accordance with the conditions adopted.

If the reaction is so conducted as to produce substantial quantities of methyl acetate, the methyl acetate may be easily saponified and worked up into acetic acid and methyl alcohol or dimethyl ether.

The process of the invention can be carried into effect in many different ways.

According to one method of performing the invention, I may, for example, use a closed train of apparatus comprising a gas circulating pump, which drives the carbon monoxide or gas mixture containing carbon monoxide first through a mixing chamber, where dimethyl ether, or dimethyl ether and water, may be incorporated with the gas in the form of vapour. The resulting gaseous mixture then passes through a heat exchanger into the reaction chamber. The products issuing from the reaction chamber pass through the heat exchanger to a condenser provided with a receiver, in which the uncondensable gases are separated from the liquid products. The liquid products are withdrawn and the gases are returned to the gas circulating pump. This circuit may be supplemented by pressure gauges, traps for acid, preheaters, flow meters, temperature controls, and so on.

The reaction chamber may contain any device which will bring the gas well into contact with the catalyst. For instance, the reaction chamber may be fitted with agitators, or it may be rotary, and the catalyst may advantageously be used in granular form deposited on a solid carrier.

The different parts of the apparatus are preferably protected against corrosion by carbon monoxide and acetic acid. Thus, for example, it is preferable to avoid the exposure of the gases to the action of iron in the apparatus, although especial alloys that will not form iron carbonyl can be used with advantage. Parts of the apparatus in contact with acetic acid may be made of or lined with copper or other metal or substance not liable to attack by acetic acid, and, as will of course be understood, parts of the apparatus in contact with both acetic acid and carbon monoxide should be made of or lined with a material (e. g. copper) capable of resisting the action of both substances.

The following examples serve to illustrate convenient methods of execution of the invention it being understood that they are given solely by way of illustration and are in no way limitative.

Example 1

A mixture of dimethyl ether and carbon monoxide containing about 5 parts by weight of dimethyl ether and 3 parts by weight of carbon monoxide is passed under a pressure of about 100 to 150 atmospheres through a reaction vessel heated to about 300° to 400° C., the reaction vessel being lined with copper and filled with a catalyst mass composed of balls or pieces of graphite or coke coated with sodium formate or sodium methylate. The reaction products are then condensed to separate the acetic acid, which is present almost completely in the form of methyl acetate.

Example 2

A gaseous mixture composed of about 5 parts by weight of dimethyl ether, about 4 parts by weight of carbon monoxide and 3 to 5 parts of steam is subjected to the reaction precisely in the manner described in Example 1. The reaction products are then condensed to separate the acetic acid, which is present largely or entirely in the form of free acetic acid.

As before mentioned the reaction of the invention enables methyl acetate and/or free acetic acid to be produced. In cases where the reaction is conducted to produce methyl acetate (or mixtures thereof with acetic acid) and it is desired to saponify the same to produce free acetic acid, such saponification may conveniently be performed continuously with the reaction or otherwise.

For instance, the saponification may be performed by the process described in the above mentioned U. S. application Serial No. 138,116 and in U. S. patent application of W. Bader Serial No. 295,611 filed 26th July, 1928, by which means the saponification of esters of organic acids can be performed in such manner as to produce free acids in an anhydrous condition. The said process consists in effecting the saponification by means of just the theoretical amount of water required for the reaction, a strong mineral acid, e. g. phosphoric or sulphuric acid, being used as the saponifying agent.

The reaction proceeds according to the equation $$2CH_3COOCH_3 + H_2O \rightarrow 2CH_3COOH + \underset{\text{dimethyl ether}}{(CH_3)_2O}$$

and the dimethyl ether so produced may if desired be submitted to the process of the present invention to produce further quantities of acetic acid or methyl acetate. In such method of saponification it is preferred to use phosphoric acid as the saponifying agent.

The reaction takes place at temperatures between about 150° and about 300° C., temperatures between 180° and 220° C. being especially advantageous. For instance at 200° C. the reaction proceeds rapidly, and results in substantially a quantitative yield.

The more highly hydrated forms of phosphoric acid for instance, orthophosphoric acid and pyrophosphoric acid, are capable of supplying the water required for the saponification, being themselves at the same time dehydrated to the form of metaphosphoric acid. It is therefore possible to perform the reaction in a continuous manner, by continuously introducing supplies of ester and water in the requisite proportions into the phosphoric acid, the phosphoric acid serving in effect as a carrier for the water.

The saponification may be carried out in any apparatus designed for the interaction of gas and liquids, for example, wash towers, mixer, bubblers, etc.

The saponification of the methyl acetate may be carried out continuously with its production. Thus for instance a mixture of carbon monoxide and dimethyl ether vapour may be passed under pressure in contact with an alkali alcoholate at 300°–400° C., and the products of reaction containing methyl acetate, preferably expanded to lower pressures, for instance atmospheric pressure, are passed together with the requisite quantity of steam through a chamber containing phosphoric acid maintained at lower temperatures, for example, 180° to 250° C.

The acetic acid can be condensed, and the dimethyl ether, which is gaseous at ordinary temperatures can be returned for admixture with further quantities of carbon monoxide for conversion into acetic acid.

The methyl acetate may however be separated from the uncondensable gases with which it is mixed, and is converted by a separate operation into glacial acetic acid and dimethyl ether.

By employing for the reaction of the present invention homologues of dimethyl ether in place of dimethyl ether, homologous aliphatic acids and/or their esters may readily be obtained. Thus, for instance, propionic acid and/or ethyl propionate may readily be obtained by employing diethyl ether. In extending the process to the treatment of such higher ethers similar precautions should be observed as to temperature, pressure and the presence or absence of water.

The term "an acetate" used hereinafter in the claims is to be understood as signifying a compound wherein the acetic radicle, $CH_3COO-$, is joined to hydrogen or an alkyl group.

What I claim and desire to secure by Letters Patent is:—

1. Process for the manufacture of an alkacyl compound which comprises subjecting an aliphatic ether of formula $(C_nH_{2n+1})_2O$ to the action of carbon monoxide in presence of at least one metal compound capable of forming an acetate by reaction with carbon monoxide.

2. Process for the manufacture of an alkacyl compound which comprises subjecting an aliphatic ether of formula $(C_nH_{2n+1})_2O$ to the action of carbon monoxide in presence of an alkali-metal formate.

3. Process for the manufacture of an alkacyl compound which comprises subjecting an aliphatic ether of formula $(C_nH_{2n+1})_2O$ to the action of carbon monoxide in presence of sodium formate.

4. Process according to claim 1 wherein the reaction is performed at a temperature between 200° and 450° C.

5. Process according to claim 1 and wherein the reaction is performed at a temperature between 200° and 450° C. and under a pressure of at least 50 atmospheres.

6. Process for the manufacture of an alkacyl compound which comprises subjecting a gaseous mixture of an aliphatic ether of formula $(C_nH_{2n+1})_2O$, carbon monoxide and steam to a temperature between 200° and 450° C. and a pressure of at least 50 atmospheres in presence of an alkali-metal formate.

7. Process for the manufacture of an alkacyl compound which comprises subjecting a gaseous mixture of an aliphatic ether of formula $(C_nH_{2n+1})_2O$, carbon monoxide and steam to a temperature between 200° and 450° C. and a pressure of at least 50 atmospheres in presence of sodium formate.

8. Process for the manufacture of an acetyl compound which comprises subjecting dimethyl ether to the action of carbon monoxide in presence of at least one metal compound capable of forming an acetate by reaction with carbon monoxide.

9. Process for the manufacture of an acetyl compound which comprises subjecting dimethyl ether to the action of carbon monoxide in presence of an alkali-metal formate.

10. Process for the manufacture of an acetyl compound which comprises subjecting dimethyl ether to the action of carbon monoxide in presence of sodium formate.

11. Process according to claim 8 and wherein the reaction is performed at a temperature between 200° and 450° C.

12. Process according to claim 8 and wherein the reaction is performed at a temperature between 200° and 450° C. and under a pressure of at least 50 atmospheres.

13. Process for the manufacture of an acetyl compound which comprises subjecting a gaseous mixture of dimethyl ether, carbon monoxide and steam to a temperature between 200° and 450° C. and a pressure of at least 50 atmospheres in presence of an alkali-metal formate.

14. Process for the manufacture of an acetyl compound which comprises subjecting a gaseous mixture of dimethyl ether, carbon monoxide and steam to a temperature between 200° and 450° C. and a pressure of at least 50 atmospheres in presence of sodium formate.

In testimony whereof I have hereunto subscribed my name.

HENRY DREYFUS.